(12) United States Patent
Sunder

(10) Patent No.: US 7,267,329 B2
(45) Date of Patent: Sep. 11, 2007

(54) ALTERNATING CONVENTIONAL AND HIGH CAPACITY PACKING WITHIN THE SAME SECTION OF AN EXCHANGE COLUMN

(75) Inventor: Swaminathan Sunder, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 203 days.

(21) Appl. No.: 11/190,570

(22) Filed: Jul. 27, 2005

(65) Prior Publication Data
US 2007/0023936 A1 Feb. 1, 2007

(51) Int. Cl.
*B01F 3/04* (2006.01)
(52) U.S. Cl. .................. 261/95; 261/112.1; 261/112.2; 29/469
(58) Field of Classification Search .................. 261/94, 261/95, 112.1, 112.2; 29/428, 469
See application file for complete search history.

(56) References Cited

U.S. PATENT DOCUMENTS

| | | | |
|---|---|---|---|
| 4,296,050 A | 10/1981 | Meier | |
| 5,632,934 A | 5/1997 | Billingham et al. | |
| 5,921,109 A | 7/1999 | Billingham et al. | |
| 6,101,841 A | 8/2000 | Billingham et al. | |
| 6,206,349 B1 | 3/2001 | Parten | |
| 6,212,907 B1 | 4/2001 | Billingham et al. | |
| 6,357,728 B1 * | 3/2002 | Sunder et al. | 261/112.2 |
| 6,427,985 B1 * | 8/2002 | Kaibel et al. | 261/112.2 |
| 6,478,290 B1 * | 11/2002 | Ender et al. | 261/112.2 |
| 6,534,022 B1 * | 3/2003 | Carlborg et al. | 422/180 |
| 2002/0141912 A1 * | 10/2002 | Murrell et al. | 422/177 |
| 2003/0094713 A1 * | 5/2003 | Sunder et al. | 261/112.2 |
| 2003/0116871 A1 * | 6/2003 | Ringo et al. | 261/94 |
| 2004/0031584 A1 * | 2/2004 | Zich et al. | 165/4 |
| 2004/0150123 A1 * | 8/2004 | Strofer et al. | 261/95 |
| 2004/0188867 A1 * | 9/2004 | Meski et al. | 261/94 |

FOREIGN PATENT DOCUMENTS

| | | |
|---|---|---|
| EP | 0 858 830 | 8/1998 |
| EP | 0 858 366 | 7/2000 |
| WO | WO97/16247 | 5/1997 |

* cited by examiner

*Primary Examiner*—Scott Bushey
(74) *Attorney, Agent, or Firm*—Willard Jones, II

(57) ABSTRACT

An assembly in an exchange column includes a plurality of generally vertically adjacent layers of structured packing. Each layer includes a plurality of generally horizontally adjacent structured packing elements, each of which has an upper edge and a lower edge. Each layer has a top having a plurality of the upper edges and a bottom having a plurality of the lower edges. In a first layer of packing at least one of the upper edge and the lower edge is modified on at least one element. In a second layer of the packing, located vertically adjacent the first layer, the upper edges and the lower edges are unmodified on substantially all of the elements, whereby one of the unmodified upper edge and the unmodified lower edge on at least one of the elements in the second layer is adjacent one of the modified edges in the first layer.

19 Claims, 2 Drawing Sheets

ALTERNATING CONVENTIONAL AND HIGH CAPACITY PACKING WITHIN THE SAME SECTION OF AN EXCHANGE COLUMN

BACKGROUND OF THE INVENTION

The present invention relates to structured packing and to methods for installing such packing in an exchange column. The structured packing has particular application in cryogenic air separation processes, although it also may be used in other heat and/or mass transfer processes that can utilize structured packing.

The term, "column" (or "exchange column") as used herein, means a distillation or fractionation column or zone, i.e., a column or zone wherein liquid and vapor phases are counter currently contacted to effect separation of a fluid mixture, such as by contacting of the vapor and liquid phases on packing elements or on a series of vertically-spaced trays or plates mounted within the column.

The term "column section" (or "section") means a zone in a column filling the column diameter. The top or bottom of a particular section or zone ends at the liquid and vapor distributors respectively.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of thin metal foil, expanded metal or woven wire screen stacked in layers or as spiral windings.

In processes such as distillation or direct contact cooling, it is advantageous to use structured packing to promote heat and mass transfer between counter-flowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

The most commonly used structured packing consists of corrugated sheets of metal or plastic foils (or corrugated mesh cloths) stacked vertically. These foils may have various forms of apertures and/or surface texture features aimed at improving the heat and mass transfer efficiency. An example of this type of structured packing is disclosed in U.S. Pat. No. 4,296,050 (Meier). It also is well-known in the prior art that mesh type packing helps spread liquid efficiently and gives good mass transfer performance, but mesh type packing is much more expensive than most foil type packing.

In conventional practice, corrugated structured packing sheets are substantially uniform in height and have straight cut edges (i.e., "unmodified" edges) such that the base and top of each section or brick are essentially flat. The bricks are stacked one on top of the other to form layers of structured packing.

Multiple layers of structured packing are placed between suitable supports inside an exchange column to form a packed section. Adjacent layers may be rotated relative to each other to facilitate proper spreading and mixing of vapor and liquid during normal operation. Liquid and vapor distributors are placed above and below each packed section to feed such fluids in a uniform fashion into the packed section.

The capacity of structured packing is limited by the resistance to fluid flow at the interfaces between successive layers of packing in a packed section. It is very desirable to increase the capacity of structured packing, since an increase in capacity allows for the use of less structured packing for any given separation, thus reducing the cost of carrying out the separation.

Usually the capacity of structured packing is limited by flooding. Mass transfer flooding, which is the premature degradation in mass transfer performance prior to the onset of hydraulic flooding, occurs when the mass transfer efficiency of the column starts deteriorating rapidly with the increase of vapor and/or liquid flow in the column. Hydraulic flooding occurs when the pressure drop across the packing bed starts increasing rapidly with the increase of vapor and/or liquid flow.

It is known from the prior art that the capacity of structured packing can be increased by modifying the edges of individual packing sheets. Typical modifications include reduced crimp heights, changed corrugation angle, serrations, apertures, etc., which modifications are typically made at the bottom of all sheets or at the top and bottom of alternating sheets. Examples of such modifications are disclosed in U.S. Pat. No. 5,632,934 (Billingham, et al.) and U.S. Pat. No. 6,101,841 (Billlingham, et al.). Other modifications include S-shaped corrugations on both ends of every sheet, such as those disclosed in EP 0 858 366 B1, U.S. Pat. No. 6,206,349 (Parten) and International Application WO 97/16247. All such modifications are made in such a way that during operation the pressure drop in the transitions is reduced. EP 0 858 830 A1 teaches that in order to maintain good mass transfer performance it is important to maintain a flat top while making any edge modifications to increase capacity. Operation of a packed column at a pressure drop greater than 0.7 inch water per foot is taught in U.S. Pat. Nos. 5,921,109 (Billingham, et al.) and U.S. Pat. No. 6,212,907 B1 (Billingham, et al). These patents cover cases wherein only the bottoms of the packing sheets are modified, and cases wherein both the tops and bottoms of the packing sheets are modified.

Although the capacity of conventional corrugated structured packing can be increased by modifying the top and/or bottom edges, such edge modified high-capacity packing does not always scale up reliably from laboratory scale small diameter columns to industrial scale large diameter columns in terms of mass transfer performance of the columns. Careful experimentation in small scale laboratory columns can identify geometries that are also suitable for good mass transfer performance. While the increase in capacity scales up reliably, the mass transfer performance can be unpredictable in large scale columns. Adding additional packing height is expensive and can negate the advantage gained from the increase in capacity.

It is desired to have an assembly of structured packing in an exchange column which significantly increases the capacity of the structured packing without any significant degradation in mass transfer performance of the exchange column.

It is further desired to increase the capacity of a section of structured packing in an exchange column by reducing the resistance to fluid flow at the interfaces between layers of packing in the packed section.

It is still further desired to have an assembly of structured packing in an exchange column which provides improved performance over that of conventional structured packing alone.

It is still further desired to have an assembly of structured packing in an exchange column which shows improved performance characteristics for cryogenic applications, such as those used in air separation, and for other heat and/or mass transfer applications.

It is still further desired to have an assembly of structured packing in an exchange column which overcomes many of the difficulties and disadvantages of the prior art to provide better and more advantageous results.

It also is desired to have a method of assembling and installing an assembly of structured packing in an exchange column which affords better performance than the prior art, and which also overcomes many of the difficulties and disadvantages of the prior art to provide better and more advantageous results.

BRIEF SUMMARY OF THE INVENTION

The present invention is an assembly of structured packing which may be used in a process for cryogenic air separation, a process for exchanging mass and/or heat between two fluids, and in an exchange column for exchanging heat and/or mass between a first phase and a second phase. The invention also includes a method for assembling an assembly of structured packing in an exchange column.

There are many embodiments and variations of the assembly. A first embodiment is an assembly of a plurality of generally vertically adjacent layers of structured packing. Each layer includes a plurality of generally horizontally adjacent structured packing elements, each structured packing element having an upper edge and a lower edge opposite the upper edge. Each layer has a top comprising a plurality of the upper edges and a bottom comprising a plurality of the lower edges. The assembly includes: a first layer of structured packing, wherein at least one of the upper edge and the lower edge is modified on at least one structured packing element in the first layer; and a second layer of structured packing located vertically adjacent the first layer of structured packing, wherein the upper edges and the lower edges are unmodified on substantially all of the structured packing elements in the second layer, whereby one of the unmodified upper edge and the unmodified lower edge on at least one of the structured packing elements in the second layer is adjacent one of the modified edges in the first layer.

In a variation of the first embodiment of the assembly, at least one of the structured packing elements is corrugated, each corrugated structured packing element having a plurality of corrugations forming alternating peaks and troughs across at least a portion of at least one surface of the corrugated structured packing element. In a variant of this variation, at least one of the upper edge and the lower edge of the at least one structured packing element in the first layer is modified by having at least one edge modification selected from a group consisting of a reduced crimp height, a changed corrugation angle, a serration, an aperture, and an S-shaped corrugation.

In another variation of the first embodiment of the assembly, the second layer of structured packing is rotated at an angle relative to the first layer of structured packing. In a variant of this variation, the angle is between about 0° and about 90°. In yet another variation, at least one of the modified edges of at least one of the structured packing elements in the first layer has a modified edge height which is about 5% to about 15% of a total height of the structured packing element.

A second embodiment of the assembly is similar to the first embodiment but includes a third layer of structured packing located vertically adjacent the second layer of structured packing at a location opposite the first layer of structured packing, wherein at least one of the upper edge and the lower edge is modified on at least one structured packing element in the third layer, whereby the other one of the unmodified upper edge and the unmodified lower edge on the at least one of the structured packing elements in the second layer is adjacent one of the modified edges in the third layer.

A third embodiment is an assembly of a plurality of generally vertically adjacent layers of structured packing. Each layer includes a plurality of generally horizontally adjacent structured packing elements, each structured packing element having an upper edge and a lower edge opposite the upper edge. Each layer has a top comprising a plurality of the upper edges and a bottom comprising a plurality of the lower edges. The assembly includes: a first layer of structured packing, wherein the upper edge and the lower edge are modified on at least one structured packing element in the first layer; a second layer of structured packing located below and vertically adjacent the first layer of structured packing, wherein the upper edges and the lower edges are unmodified on substantially all of the structured packing elements in the second layer; and a third layer of structured packing located below and vertically adjacent the second layer of structured packing, wherein the upper edge and the lower edge are modified on at least one structured packing element in the third layer.

Another aspect of the invention is an exchange column for exchanging heat and/or mass between a first phase and a second phase. The exchange column has at least one structured packing section comprising at least one assembly of a plurality of generally vertically adjacent layers of structured packing as in one of the above-described embodiments of the assembly or variations thereof.

Yet another aspect of the invention is a process for cryogenic air separation comprising contacting vapor and liquid counter-currently in at least one distillation column containing at least one mass transfer zone wherein liquid-vapor contact is established by at least one structured packing section comprising at least one assembly of a plurality of generally vertically adjacent layers of structured packing as in one of the above-described embodiments of the assembly or variations thereof.

Still yet another aspect of the invention is a process for exchanging mass and/or heat between two fluids comprising contacting said fluids in at least one exchange column wherein a fluid-fluid contact is established by at least one structured packing section having at least one assembly of a plurality of generally vertically adjacent layers of structured packing as in one of the above-described embodiments of the assembly or variations thereof.

There also are many embodiments and variations of the method for assembling aspect of the invention. A first embodiment is a method for assembling an assembly of a plurality of generally vertically adjacent layers of structured packing. Each layer includes a plurality of generally horizontally adjacent structured packing elements, each structured packing element having an upper edge and a lower edge opposite the lower edge. Each layer has a top comprising a plurality of the upper edges and a bottom comprising a plurality of the lower edges. The method for assembling includes multiple steps. The first step is to provide an exchange column. The second step is to install in the exchange column a first layer of structured packing, wherein at least one of the upper edge and the lower edge is modified on at least one structured packing element in the first layer. The third step is to install in the exchange column a second layer of structured packing located vertically adjacent the first layer of structured packing, wherein the upper edges and the lower edges are unmodified on substantially all of the structured packing elements in the second layer, whereby one of the unmodified upper edge and the unmodified lower edge on at least one of the structured packing elements in the second layer is adjacent one of the modified edges in the first layer.

There are many variations of the first embodiment of the method for assembling. In one variation, at least one of the structured packing elements is corrugated, each corrugated structured packing element having a plurality of corrugations for forming alternating peaks and troughs across at least a portion of at least one surface of the corrugated structured packing element. In a variant of this variation, at least one of the upper edge and the lower edge of the at least one structured packing element in the first layer is modified by having at least one edge modification selected from a group consisting of a reduced crimp height, a changed corrugation angle, a serration, an aperture, and an S-shaped corrugation.

In another variation of the method for assembling, the second layer of structured packing is rotated at an angle relative to the first layer of structured packing. In a variant of this variation, the angle is between about 0° and about 90°. In yet another variation, at least one of the modified edges of at least one of the structured packing elements in the first layer has a modified edge height which is about 5% to about 15% of a total height of the structured packing element.

A second embodiment of the method for assembling is similar to the first embodiment of the method but includes an additional step of installing in the exchange column a third layer of structured packing located vertically adjacent the second layer of structured packing at a location opposite the first layer of structured packing, wherein at least one of the upper edge and the lower edge is modified on at least one structured packing element in the third layer, whereby the other one of the unmodified upper edge and the unmodified lower edge on the at least one of the structured packing elements in the second layer is adjacent one of the modified edges in the third layer.

A third embodiment is a method for assembling an assembly of a plurality of generally vertically adjacent layers of structured packing. Each layer includes a plurality of generally horizontally adjacent structured packing elements, each structured packing element having an upper edge and a lower edge opposite the upper edge. Each layer has a top comprising a plurality of the upper edges and a bottom comprising a plurality of the lower edges. The third embodiment of the method includes multiple steps. The first step is to provide an exchange column. The second step is to install in the exchange column a first layer of structured packing, wherein the upper edge and the lower edge are modified on at least one structured packing element in the first layer. The third step is to install in the exchange column a second layer of structured packing located below and vertically adjacent the first layer of structured packing, wherein the upper edges and the lower edges are unmodified on substantially all of the structured packing elements in the second layer. The fourth step is to install in the exchange column a third layer of structured packing located below and vertically adjacent the second layer of structured packing, wherein the upper edge and the lower edge are modified on at least one structured packing element in the third layer.

BRIEF DESCRIPTION OF THE DRAWINGS

The invention will be described by way of example with reference to the accompanying drawings, in which.

DETAILED DESCRIPTION OF THE INVENTION

The present invention uses alternating layers of conventional structured packing ("unmodified" structured packing) and edge modified structured packing within the same section of an exchange column. While increased capacity is obtained from the edge modified structured packing, the presence of the conventional structured packing ensures maintaining good mass transfer performance, especially in industrial scale large diameter exchange columns.

Applicants found that edge modifications of structured packing can increase the hydraulic capacity of a packed section. Specifically, the pressure drop can be reduced at the same flow, or more flow can be put through at the same pressure drop, compared to conventional unmodified structured packing.

Many types of edge modifications can be made such that the good mass transfer characteristics of the modified structured packing can be obtained in laboratory columns which are usually small in diameter. But such edge modified packings do not always perform as well in large scale columns typical of industrial applications. While the reduction in pressure drop scales readily, thereby giving the large columns the expected increase in hydraulic capacity, the mass transfer performance varies in an unacceptable fashion. To deal with this uncertainty, extra packing height must be added to industrial columns, which adds cost to the system.

The present invention addresses this problem by employing packed sections which use alternating layers of conventional structured packing ("unmodified" structured packing) and edge "modified" structured packing. In one embodiment, such layers are used in strict alternation, i.e., one "unmodified" layer for every edge "modified" layer.

In another embodiment, an "unmodified" layer(s) of structured packing is used periodically within a section such that the section includes one "unmodified" layer of structured packing for every two or three edge "modified" layers of structured packing. Persons skilled in the art will recognize that many other embodiments and variations thereof are possible by using different sequences or arrangements of the two different types of layers of packing (modified and unmodified).

Figure 3:
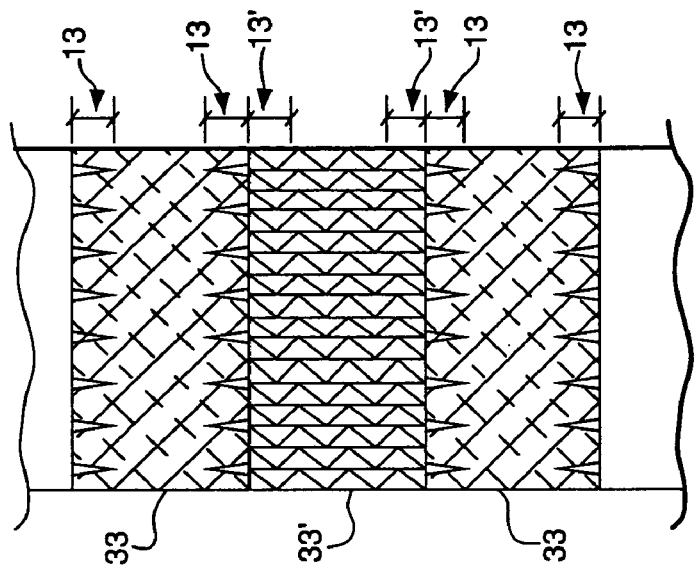
FIG. 3 is a schematic diagram illustrating another conventional packed section in an exchange column using conventional high-capacity packing wherein each adjacent layer of packing includes another type of edge modified corrugated structured packing elements modified at both the top and the bottom.
Figure 2:
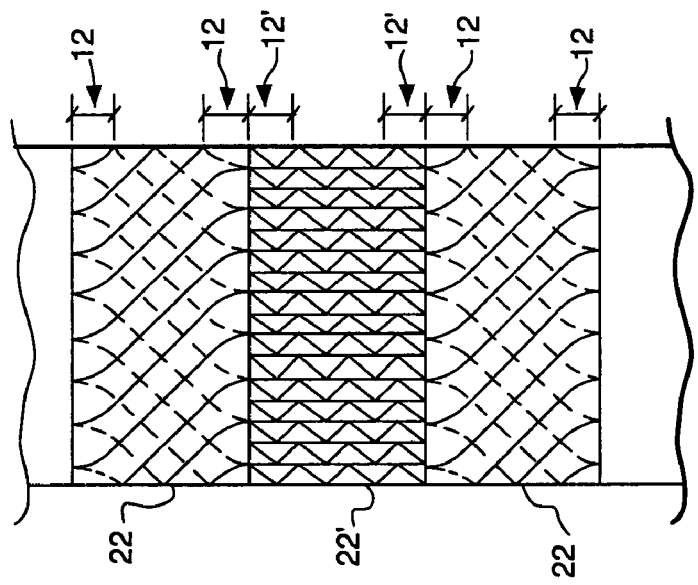
FIG. 2 is a schematic diagram illustrating another conventional packed section in an exchange column using conventional high-capacity packing wherein each adjacent layer of packing includes edge modified corrugated structured packing elements modified at both the top and the bottom.
Figure 1:
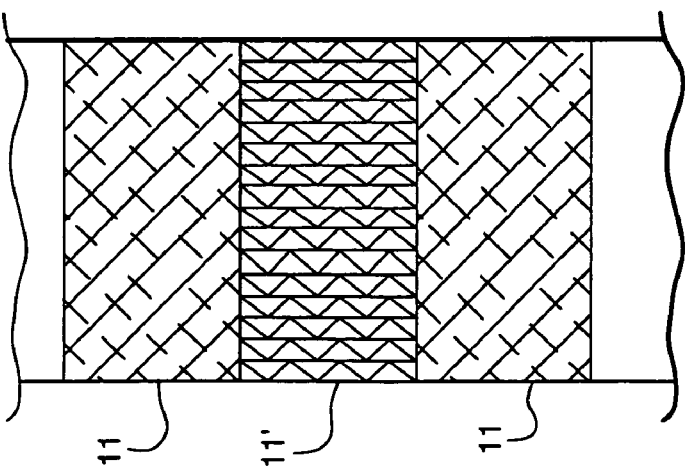
FIG. 1 is a schematic diagram illustrating a conventional packed section in an exchange column using conventional unmodified corrugated structured packing elements in each of the adjacent layers of packing in the packed section.
Figure 5:
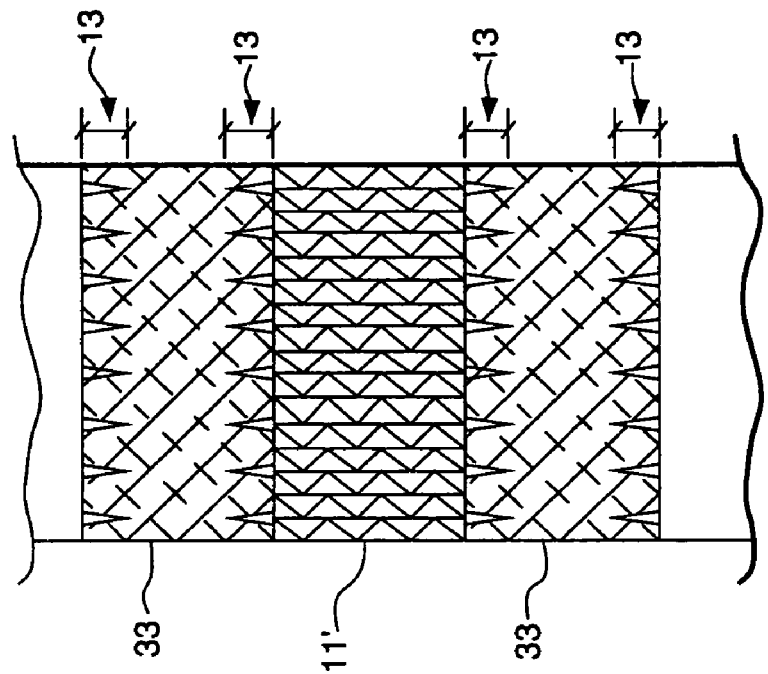
FIG. 5 is a schematic diagram illustrating another embodiment of the present invention.
Figure 4:
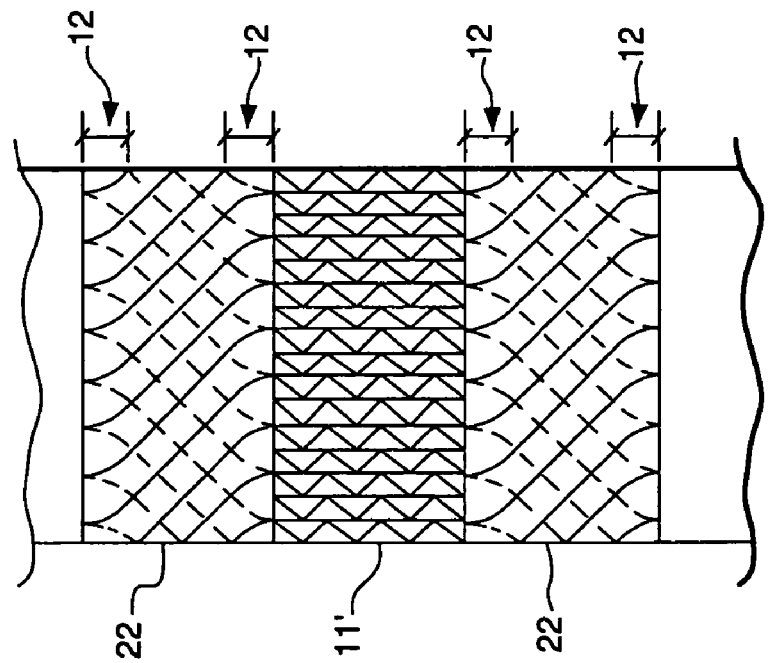
FIG. 4 is a schematic diagram illustrating one embodiment of the present invention.

Referring to the drawings, FIGS. 1-3 illustrate prior art packed sections in exchange columns, and FIGS. 4-5 illustrate two embodiments of the present invention. With regard to the prior art, FIG. 1 illustrates a packed column section using conventional packing, and FIGS. 2 and 3 illustrate packed column sections using two different types of conventional high-capacity packing, which are discussed below. A comparison of the arrangements of the layers in the prior art packed sections (FIGS. 1-3) to the arrangements of the layers in the prior art packed sections (FIGS. 4-5) is useful in explaining/understanding the present invention.

The prior art packed section shown in FIG. 1 uses unmodified corrugated structured packing elements in each of the adjacent layers of packing in the packed section. The upper layer 11 is the same as the lower layer 11. The middle layer 11' is the same as the other two layers 11 but is rotated 90° relative to those layers.

The prior art high-capacity packed section in FIG. 2 uses multiple layers of edge modified corrugated structured packing elements modified at both the top and the bottom of the elements. In the packed section illustrated, the edge modification is in the form of an S-shaped corrugation which turns toward the flow direction of the fluids that pass through the section. As shown in FIG. 2, the modified edges 12 are at both the top and the bottom of each of the upper layer 22 and the lower layer 22. At the interfaces of the middle layer with the upper layer and with the lower layer, the modified edges 12' of the middle layer are adjacent the modified edges 12 of the upper and lower layers 22. The middle layer 22' is the same as the upper and lower layers 22 but is rotated 90° relative to those layers.

In the prior art high-capacity packed section shown in FIG. 3, the upper layer 33 and the lower layer 33 are the same, as is the middle layer 33' except that it is rotated 90° relative to the other two layers. Each layer is made of edge modified corrugated structured packing elements (modified differently than those in FIG. 2) which are modified at both the top and the bottom. At the interface of the middle layer with the upper layer and the interface of the middle layer with the lower layer, the modified edges 13' of the middle layer are adjacent the modified edges 13 of the upper and lower layers 33. The modification of the edges is in the form of serrations illustrated by the notches (shown as triangles) at the top and the bottom of each of the upper and lower layers 33 in FIG. 3.

In the embodiment of the present invention illustrated in FIG. 4, the middle layer 11' of the corrugated structured packing is the same as the middle layer 11 of the conventional packing shown in FIG. 1. The edges of the elements in this middle layer are unmodified. However, the upper layer 22 of corrugated structured packing and the lower layer 22 of corrugated structured packing have modified edges 12. The interface between the upper layer 22 and the middle layer 11' has an unmodified edge at the top of the middle layer 11' adjacent the modified edge 12 at the bottom of the upper layer 22. Similarly, at the interface between the middle layer 11' and the lower layer 22, there is an unmodified edge at the bottom of the middle layer 11' adjacent the modified edge 12 at the top of the lower layer 22.

In the present invention, the modified edges at the top of a layer comprise about 5-15% of the total height of the layer, and the modified edges at the bottom of a layer comprise about 5-15% of the total height of the layer. Therefore, for a layer having modified edges at both the top and bottom, the modified edges comprise about 10-30% of the total height of the layer.

In the embodiment illustrated in FIG. 4, the edge modification is in the form of S-shaped corrugations. However, persons skilled in the art will recognize that there are other forms of edge modification that may be used in other embodiments of the invention, including but not limited to reduced crimp height, changed corrugation angle, various types of serrations, apertures, etc.

FIG. 5 illustrates another such embodiment of the present invention. In this embodiment, the upper layer 33 of corrugated structured packing and the lower layer 33 of corrugated structured packing have modified edges 13. The middle layer 11' in FIG. 5 is the same as the conventional corrugated structured packing layer 11 shown in FIG. 1. In the embodiment of FIG. 5, an unmodified edge at the top of the middle layer 11' is adjacent a modified edge at the bottom of the upper layer 33. Also, an unmodified edge at the bottom of the middle layer 11' is adjacent a modified edge 13 at the top of the lower layer 33.

In the packed sections illustrated in the embodiments of the present invention which are shown in FIGS. 4 and 5, a limited number (three) of layers are shown to illustrate the invention, which actually requires only two layers (a conventional layer adjacent a modified layer having modified edges at the interface of the two layers). Persons skilled in the art will recognize, however, that a packed section employing the present invention in an exchange column may include many more layers above and below the layers illustrated in FIGS. 4 and 5.

As indicated, the alternation of, or the sequencing of, the layers of conventional packing (unmodified packing) with the layers of high-capacity packing (modified packing) may vary in many different ways from the embodiments illustrated and/or discussed herein. As stated, one variation is to have strict alternation (i.e., one "unmodified" layer for every edge "modified" layer). An alternative is to have one "unmodified" layer of packing for every two or three edge "modified" layers of packing. However, the sequencing and arrangement of layers within a section or column need not be uniform or symmetrical, as many other arrangements are possible, so long as every interface of a conventional layer of packing with an adjacent high-capacity layer of packing includes an unmodified edge (of the conventional layer) adjacent a modified edge (of the high-capacity layer).

Persons skilled in the art will recognize that many other embodiments and variations of the invention are possible. For example, although each of the layers illustrated in FIGS. 4 and 5 are of substantially equal height for those illustrated embodiments of the invention, some or all of the layers may have different heights in other embodiments and variations of the invention.

Accordingly, although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An assembly of a plurality of generally vertically adjacent layers of structured packing, each layer comprising a plurality of generally horizontally adjacent structured packing elements, each structured packing element having an upper edge and a lower edge opposite the upper edge, and each layer having a top comprising a plurality of the upper edges and a bottom comprising a plurality of the lower edges, the assembly comprising:
   a first layer of structured packing, wherein at least one of the upper edge and the lower edge is modified on at least one structured packing element in the first layer; and
   a second layer of structured packing located vertically adjacent the first layer of structured packing, wherein the upper edges and the lower edges are unmodified on substantially all of the structured packing elements in the second layer,
   whereby one of the unmodified upper edge and the unmodified lower edge on at least one of the structured packing elements in the second layer is adjacent one of the modified edges in the first layer.

2. The assembly of claim 1, further comprising:
   a third layer of structured packing located vertically adjacent the second layer of structured packing at a location opposite the first layer of structured packing, wherein at least one of the upper edge and the lower edge is modified on at least one structured packing element in the third layer,
   whereby the other one of the unmodified upper edge and the unmodified lower edge on the at least one of the structured packing elements in the second layer is adjacent one of the modified edges in the third layer.

3. The assembly of claim 1, wherein at least one of the structured packing elements is corrugated, each corrugated structured packing element having a plurality of corrugations forming alternating peaks and troughs across at least a portion of at least one surface of the corrugated structured packing element.

4. The assembly of claim 3, wherein at least one of the upper edge and the lower edge of the at least one structured packing element in the first layer is modified by having at least one edge modification selected from a group consisting of a reduced crimp height, a changed corrugation angle, a serration, an aperture, and an S-shaped corrugation.

5. The assembly of claim 1, wherein the second layer of structured packing is rotated at an angle relative to the first layer of structured packing.

6. The assembly of claim 5, wherein the angle is between about 0° and about 90°.

7. The assembly of claim 1, wherein at least one of the modified edges of at least one of the structured packing elements in the first layer has a modified edge height which is about 5% to about 15% of a total height of the structured packing element.

8. An assembly of a plurality of generally vertically adjacent layers of structured packing, each layer comprising a plurality of generally horizontally adjacent structured packing elements, each structured packing element having an upper edge and a lower edge opposite the upper edge, and each layer having a top comprising a plurality of the upper edges and a bottom comprising a plurality of the lower edges, the assembly comprising:
   a first layer of structured packing, wherein the upper edge and the lower edge are modified on at least one structured packing element in the first layer;
   a second layer of structured packing located below and vertically adjacent the first layer of structured packing, wherein the upper edges and the lower edges are unmodified on substantially all of the structured packing elements in the second layer; and
   a third layer of structured packing located below and vertically adjacent the second layer of structured packing, wherein the upper edge and the lower edge are modified on at least one structured packing element in the third layer.

9. An exchange column for exchanging heat and/or mass between a first phase and a second phase, the exchange column having at least one structured packing section comprising at least one assembly of a plurality of generally vertically adjacent layers of structured packing as in claim 1.

10. A process for cryogenic air separation comprising contacting vapor and liquid counter-currently in at least one distillation column containing at least one mass transfer zone wherein liquid-vapor contact is established by at least one structured packing section comprising at least one assembly of a plurality of generally vertically adjacent layers of structured packing as in claim 1.

11. A process for exchanging mass and/or heat between two fluids comprising contacting said fluids in at least one exchange column wherein a fluid-fluid contact is established by at least one structured packing section having at least one assembly of a plurality of generally vertically adjacent layers of structured packing as in claim 1.

12. A method for assembling an assembly of a plurality of generally vertically adjacent layers of structured packing, each layer comprising a plurality of generally horizontally adjacent structured packing elements, each structured packing element having an upper edge and a lower edge opposite the upper edge, and each layer having a top comprising a plurality of the upper edges and a bottom comprising a plurality of the lower edges, comprising the steps of:
   providing an exchange column;
   installing in the exchange column a first layer of structured packing, wherein at least one of the upper edge and the lower edge is modified on at least one structured packing element in the first layer; and
   installing in the exchange column a second layer of structured packing located vertically adjacent the first layer of structured packing, wherein the upper edges and the lower edges are unmodified on substantially all of the structured packing elements in the second layer,
   whereby one of the unmodified upper edge and the unmodified lower edge on at least one of the structured packing elements in the second layer is adjacent one of the modified edges in the first layer.

13. The method for assembling of claim 12, further comprising the further step of:
   installing in the exchange column a third layer of structured packing located vertically adjacent the second layer of structured packing at a location opposite the first layer of structured packing, wherein at least one of the upper edge and the lower edge is modified on at least one structured packing element in the third layer,
   whereby the other one of the unmodified upper edge and the unmodified lower edge on the at least one of the structured packing elements in the second layer is adjacent one of the modified edges in the third layer.

14. The method for assembling of claim 12, wherein at least one of the structured packing elements is corrugated, each corrugated structured packing element having a plurality of corrugations forming alternating peaks and troughs across at least a portion of at least one surface of the corrugated structured packing element.

15. The method for assembling of claim 14, wherein at least one of the upper edge and the lower edge of the at least one structured packing element in the first layer is modified by having at least one edge modification selected from a group consisting of a reduced crimp height, a changed corrugation angle, a serration, an aperture, and an S-shaped corrugation.

16. The method for assembling of claim 12, wherein the second layer of structured packing is rotated at an angle relative to the first layer of structured packing.

17. The method for assembling of claim 16, wherein the angle is between about 0° and about 90°.

18. The method for assembling of claim 12, wherein at least one of the modified edges of at least one of the structured packing elements in the first layer has a modified edge height which is about 5% to about 15% of a total height of the structured packing element.

19. A method for assembling an assembly of a plurality of generally vertically adjacent layers of structured packing, each layer comprising a plurality of generally horizontally adjacent structured packing elements, each structured packing element having an upper edge and a lower edge opposite the upper edge, and each layer having a top comprising a plurality of the upper edges and a bottom comprising a plurality of the lower edges, comprising the steps of:

providing an exchange column;

installing in the exchange column a first layer of structured packing, wherein the upper edge and the lower edge are modified on at least one structured packing element in the first layer;

installing in the exchange column a second layer of structured packing located below and vertically adjacent the first layer of structured packing, wherein the upper edges and the lower edges are unmodified on substantially all of the structured packing elements in the second layer; and installing in the exchange column a third layer of structured packing located below and vertically adjacent the second layer of structured packing, wherein the upper edge and the lower edge are modified on at least one structured packing element in the third layer.

* * * * *